US011603096B2

United States Patent
Tokimasa et al.

(10) Patent No.: US 11,603,096 B2
(45) Date of Patent: Mar. 14, 2023

(54) TRAVELING CONTROL APPARATUS (71) Applicants: DENSO CORPORATION, Kariya (JP); TOYOTA JIDOSHA KABUSHIKI KAISHA, Toyota (JP)

(72) Inventors: Mitsuhiro Tokimasa, Kariya (JP); Takuma Sudo, Kariya (JP); Takashi Maeda, Toyota (JP); Naoki Kusumoto, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 904 days.

(21) Appl. No.: 16/412,782

(22) Filed: May 15, 2019

(65) Prior Publication Data
US 2019/0263402 A1   Aug. 29, 2019

Related U.S. Application Data (63) Continuation of application No. PCT/JP2017/039082, filed on Oct. 30, 2017.

(30) Foreign Application Priority Data

Nov. 17, 2016   (JP) .............................. JP2016-224532

(51) Int. Cl.
*B60W 30/16* (2020.01)
*B60W 30/14* (2006.01)
(Continued)

(52) U.S. Cl.
CPC ............... *B60W 30/16* (2013.01); *B60T 7/12* (2013.01); *B60W 30/143* (2013.01);
(Continued)

(58) Field of Classification Search
CPC ............... B60W 30/16; B60W 30/143; B60W 50/0098; B60W 2554/804;
(Continued)

(56) References Cited

U.S. PATENT DOCUMENTS 5,710,565 A * 1/1998 Shirai .................... G05D 1/024
342/72
2009/0045999 A1* 2/2009 Samukawa ........... G01S 17/931
342/70
(Continued)

FOREIGN PATENT DOCUMENTS

EP    2089262 B1 *  9/2010   ........... G01S 13/345
EP    2527221 A1 * 11/2012   ............ B60W 30/16
(Continued)

OTHER PUBLICATIONS

Machine translation of JP-2004017763-A (Year: 2004).*
Machine translation of EP-2089262-B1 (Year: 2010).*
Machine translation of EP-2527221-A1 (Year: 2012).*

*Primary Examiner* — Jeff A Burke
*Assistant Examiner* — Mohamad O El Sayah
(74) *Attorney, Agent, or Firm* — Maschoff Brennan (57) ABSTRACT

A traveling control apparatus performs a target-following control process on a target to be followed detected by a target detecting unit. Further, the traveling control apparatus calculates a probability that the target to be followed is within an own lane, and determines whether a degree of recognition by the target detecting unit of the target to be followed is in a weakly recognized state where the degree of recognition is weaker than a predetermined degree. The apparatus sets a reliability of the target to be followed on the basis of the probability calculated by a probability calculating process and a determination result by a determining process, and controls acceleration of an own vehicle so that a jerk which is a differential value of the acceleration
(Continued)

becomes smaller as the reliability of the target to be followed is lower while the target-following control process is performed.

5 Claims, 3 Drawing Sheets (51) Int. Cl.
  *B60W 50/00* (2006.01)
  *G05D 1/00* (2006.01)
  *G05D 1/02* (2020.01)
  *B60T 7/12* (2006.01)
  *G08G 1/16* (2006.01)
(52) U.S. Cl.
  CPC ....... *B60W 50/0098* (2013.01); *G05D 1/0088* (2013.01); *G05D 1/0223* (2013.01); *G08G 1/16* (2013.01); *B60W 2554/804* (2020.02); *B60W 2720/10* (2013.01); *G05D 2201/0213* (2013.01)

(58) Field of Classification Search
  CPC ....... B60W 2720/10; B60W 2720/106; B60W 30/165; B60T 7/12; G08G 1/16; G05D 1/0223; B60K 2031/0016
  See application file for complete search history.

(56) References Cited

U.S. PATENT DOCUMENTS

2015/0232104 A1* 8/2015 Sudou ................ B60W 30/16
  701/1
2017/0248952 A1* 8/2017 Perkins ............... B60W 50/082

FOREIGN PATENT DOCUMENTS

| JP | 2004017763 A | * | 1/2004 |
| JP | 2006-038697 A | | 2/2006 |
| JP | 2012-118868 A | | 6/2012 |
| JP | 2015-058752 A | | 3/2015 |

* cited by examiner

TRAVELING CONTROL APPARATUS

CROSS-REFERENCE TO RELATED APPLICATION

The present application is a continuation application of International Application No. PCT/JP2017/039082, filed Oct. 30, 2017, which claims priority to Japanese Patent Application No. 2016-224532, filed Nov. 17, 2016. The contents of these applications are incorporated herein by reference in their entirety.

BACKGROUND

Technical Field

The present disclosure relates to a traveling control apparatus which causes an own vehicle to travel while following a preceding vehicle which travels ahead in a traveling direction of the own vehicle.

Related Art

ACC (Adaptive Cruise Control) selects a preceding vehicle among other vehicles existing around a vehicle, ahead in a traveling direction of the vehicle, and causes the vehicle to follow the preceding vehicle.

SUMMARY

The present disclosure provides a traveling control apparatus. In the present disclosure, a traveling control apparatus is applied to a vehicle including a target detecting unit configured to detect targets existing ahead in a traveling direction of an own vehicle. The traveling control apparatus calculates a probability that the target to be followed is within an own lane, and determines whether a degree of recognition by the target detecting unit of the target to be followed is in a weakly recognized state where the degree of recognition is weaker than a predetermined degree. The apparatus sets a reliability of the target to be followed on the basis of the probability calculated by a probability calculating process and a determination result by a determining process, and controls acceleration of an own vehicle so that a jerk which is a differential value of the acceleration becomes smaller as the reliability of the target to be followed is lower while the target-following control process is performed.

BRIEF DESCRIPTION OF THE DRAWINGS

The above and other objects, features and advantages of the present disclosure will become more clear from the following detailed description with reference to the accompanying drawings, in which.

DETAILED DESCRIPTION OF THE PREFERRED EMBODIMENTS

The inventor of the present disclosure has studied the following technique as a traveling control apparatus capable of suppressing fluctuation of acceleration of an own vehicle.

In the ACC, acceleration and deceleration control is performed so that a distance between a vehicle and a preceding vehicle becomes constant so as to cause the vehicle to follow the selected preceding vehicle. Further, in the case where a preceding vehicle does not exist, control of maintaining constant speed of the vehicle is performed so that the speed of the vehicle becomes speed set by a driver, a speed limit of a road, or the like.

By the way, for example, a case will be assumed where the ACC is performed in a situation where the own vehicle is traveling in an inner lane among two lanes, and another vehicle is traveling in an outer lane. At this time, there is a possibility that, by the other vehicle turning left in a situation where the other vehicle is traveling ahead of the own vehicle, the other vehicle which turns left ahead in the traveling direction of the own vehicle may be captured. At this time, it is difficult for the own vehicle to determine whether the other vehicle is traveling on the own lane, and there is a possibility that the own vehicle may recognize the other vehicle as a preceding vehicle and may perform unnecessary deceleration. To address this, in Japanese Unexamined Patent Application Publication No. 2015-58752 (hereinafter, referred to as "JP-2015-58752-A"), an own lane existence probability is calculated as a possibility that an object exists in the own lane on the basis of a lateral location of the object existing ahead of the own vehicle, and a limit value of target acceleration of the own vehicle is set in accordance with the calculated own lane existence probability. Meanwhile, the limit value of the target acceleration is set in accordance with a distance from the own vehicle to the object. Then, by a smaller value between the respectively set limit values of the target acceleration being determined as the limit value of the target acceleration, it is possible to suppress precipitous acceleration and deceleration even when a preceding vehicle is erroneously selected.

However, in JP-2015-58752-A, because a limit value of target acceleration is set only in accordance with an own lane existence probability of an object and a distance from an own vehicle to the object, it is assumed that a slope of the target acceleration until the acceleration is controlled to be the set limit value of the target acceleration becomes great. That is, in process of the acceleration of the own vehicle being controlled to be the set limit value of the target acceleration, there is a possibility that the acceleration of the own vehicle may fluctuate rapidly. Further, in JP-2015-58752-A, while an object is detected using a millimeter wave radar, the object detected using the millimeter wave radar does not necessarily actually exist. That is, there is a case where the millimeter wave radar may erroneously detect an object which does not exist for some reason. Therefore, while, there is a situation where, even if an object is detected by the millimeter wave radar, it is inappropriate to perform the ACC on the object detected by the millimeter wave radar, JP-2015-58752-A neither discloses nor suggests control in which the above-described situation is taken into account. Therefore, there is a possibility that target-following control process may be performed on a target which does not actually exist, and acceleration of the own vehicle may fluctuate.

The present disclosure has been made to solve the above-described problem, and a main object of the present disclosure is to provide a traveling control apparatus which can judge whether a target is appropriate as a target for target-following control on the basis of a traveling state of a target and a target recognized state, and, in the case where there is a high possibility that the target is inappropriate as the target for the target-following control, can suppress fluctuation of acceleration of an own vehicle.

The present disclosure is a traveling control apparatus which is applied to a vehicle including a target detecting unit configured to detect targets existing ahead in a traveling direction of an own vehicle, and which includes a target-following control unit configured to recognize the target traveling ahead within an own lane which is a traveling lane in which the own vehicle travels, as a target to be followed, among the targets detected by the target detecting unit, and perform a target-following control process on the target to be followed, the traveling control apparatus including, a probability calculating unit configured to calculate a probability that the target to be followed is within the own lane, a determining unit configured to determine whether a degree of recognition of the target detecting unit with respect to the target to be followed recognized by the target-following control unit is in a weakly recognized state where the degree of recognition is weaker than a predetermined degree, a reliability setting unit configured to set a reliability of the target to be followed recognized by the target-following control unit on the basis of the probability calculated by the probability calculating unit and a determination result by the determining unit, and an acceleration control unit configured to control acceleration of the own vehicle so that a jerk which is a differential value of the acceleration becomes smaller as the reliability of the target to be followed set by the reliability setting unit is lower during a period in which the target-following control process is performed by the target-following control unit.

For example, a case will be assumed where the target-following control process is performed in a situation where an own vehicle is traveling in an inner lane among two lanes, and another vehicle is traveling in an outer lane. In this case, there is a possibility that, by the other vehicle turning left in a situation where the other vehicle travels ahead of the own vehicle, the other vehicle which turns left ahead in the traveling direction of the own vehicle may be captured. At this time, it is difficult for the own vehicle to determine whether the other vehicle is traveling on an own lane, and there is a possibility that the own vehicle may erroneously recognize the other vehicle as a preceding vehicle and may perform unnecessary deceleration.

To address this, at the present traveling control apparatus, a probability that the target to be followed recognized by the target-following control unit is within the own lane is calculated by the probability calculating unit. Further, whether a degree of recognition of the target detecting unit with respect to the target to be followed is in the weakly recognized state is determined by the determining unit while taking into account that the target detected by the target detecting unit does not necessarily exist. Then, a reliability of the target to be followed recognized by the target-following control unit is set by the reliability setting unit on the basis of the probability calculated by the probability calculating unit and a determination result by the determining unit. That is, whether the target to be followed recognized by the target-following control unit is truly appropriate as a target for target-following control is quantified as the reliability on the basis of the probability calculated by the probability calculating unit and the determination result by the determining unit. Therefore, in the case where the reliability of the target to be followed is set lower by the reliability setting unit, there is a possibility that the target to be followed recognized by the target-following control unit does not exist within the own lane or there is a possibility that the target detected by the target detecting unit does not even exist. Therefore, in the case where the reliability of the target to be followed is set lower by the reliability setting unit, the target to be followed recognized by the target-following control unit is highly likely to be a target which is not appropriate for a target for target-following control.

Therefore, the acceleration of the own vehicle is controlled so that the jerk becomes smaller as the reliability of the target to be followed set by the reliability setting unit is lower. By this means, it is possible to keep fluctuation of the acceleration of the own vehicle smaller as a possibility that the target which is not appropriate as a target for target-following control is erroneously recognized as the target to be followed is higher.

The foregoing and other features and advantages of the present disclosure will become more apparent in the light of the following detailed description of preferred embodiments thereof as discussed and illustrated in the accompanying drawings.

Figure 1:
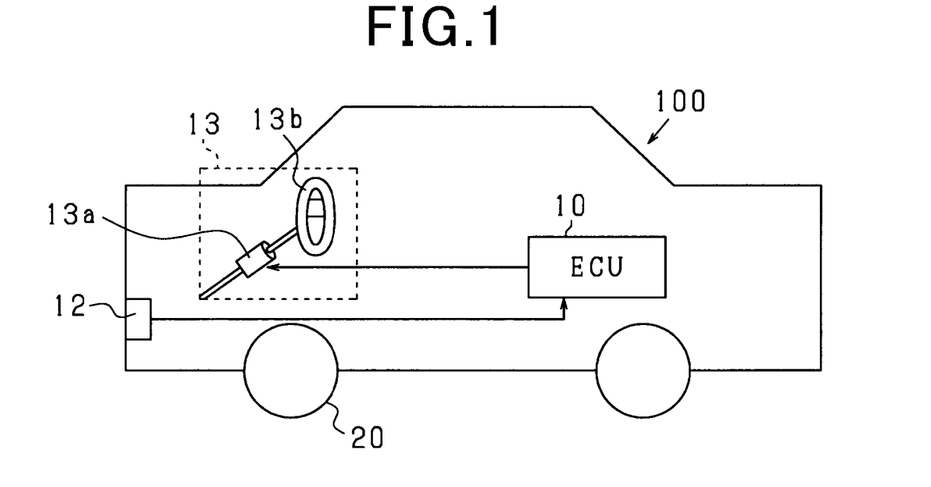
FIG. 1 is a schematic configuration diagram of a traveling control system according to the present embodiment.

A traveling control system 100 to be applied to a vehicle which travels by a drive wheel 20 being rotationally driven will be described with reference to FIG. 1. The traveling control system 100 includes a detection ECU 10, a radar apparatus 12 and an electric power steering 13.

The radar apparatus 12, which is, for example, a publicly known millimeter wave radar which uses a high frequency signal of a millimeter wave band as a transmission wave, is provided at a front end portion of an own vehicle, has a region within a predetermined detection angle as a detection range in which a target can be detected, and detects a location of a target within the detection range. Specifically, search waves are transmitted with a predetermined period, reflected waves are received with a plurality of antennas, and, in the case where intensity of the received reflected waves (corresponding to a parameter for detecting a target) is higher than first predetermined intensity (corresponding to a first predetermined value), it is determined that a target exists ahead in a traveling direction of the own vehicle, and a distance to the target is calculated from transmission time of the search waves and reception time of the reflected waves. Further, relative speed (specifically, relative speed of a vehicle in a traveling direction) is calculated from a frequency of the reflected waves reflected by the target, which is changed by the Doppler effect. In addition, azimuth of the target is calculated from a phase difference among the reflected waves received with the plurality of antennas. Note that, if the location and the azimuth of the target can be calculated, it is possible to specify a lateral location of the target which indicates a location with respect to the own vehicle in a lateral direction which is orthogonal to the traveling direction of the own vehicle. Therefore, the radar apparatus 12 corresponds to a target detecting unit. The radar apparatus 12 performs transmission of search waves, reception of reflected waves, and calculation of a reflection location and relative speed for each predetermined period, and transmits the calculated reflection location and relative speed to the detection ECU 10.

The radar apparatus 12 is connected to the detection ECU 10. The detection ECU 10, which is a computer including a CPU, a RAM, a ROM, an I/O, or the like, implements various functions by the CPU implementing a program installed in the ROM. Therefore, the detection. ECU corresponds to a probability calculating unit, a determining unit, a reliability setting unit, an acceleration control unit and a target-following control unit.

In the present embodiment, the program installed in the ROM is a control program for capturing a preceding vehicle which travels ahead within an own lane which is a traveling lane in which the own vehicle travels, on the basis of information (such as the calculated location and relative speed) of the target detected by the radar apparatus 12 and causing specified target-following control process to be performed while the preceding vehicle is captured. Note that, in the case where a preceding vehicle is not captured, traveling control in which traveling is performed at set predetermined vehicle speed is performed.

In the present control program, an own lane existence probability which is a probability that the target is within the own lane is calculated on the basis of a lateral location of the target which exists ahead of the own vehicle, and which is detected by the radar apparatus 12, with respect to the own vehicle. A greater own lane existence probability is calculated for a smaller lateral location of the target. A target for which the calculated own lane existence probability is higher than a predetermined probability (for example, set at 50%) is determined as a preceding vehicle which travels ahead within the own lane, and the preceding vehicle is recognized as a target to be followed. Then, target acceleration is set so that a distance between the own vehicle and the target to be followed is maintained at a target distance between vehicles. Note that the target distance between vehicles changes in accordance with vehicle speed of the own vehicle. Further, the distance between the own vehicle and the target to be followed is acquired from the radar apparatus 12.

Steering processing of controlling the traveling direction of the own vehicle is performed so as to cause the own vehicle to travel while following the target to be followed while accelerating and decelerating the own vehicle by transmitting a control command to an engine and a brake apparatus which are not illustrated, on the basis of the set target acceleration. Therefore, the electric power steering 13 is provided at the own vehicle as an apparatus which is driven by a steering command from the detection ECU 10.

The electric power steering 13 includes a steering 13b which operates a steering angle of the drive wheel 20 provided at the vehicle and a steering electric motor 13a. The steering electric motor 13a generates steering force (torque) which assists operating force of the steering 13b. As this torque is greater, the steering angle of the drive wheel 20 becomes greater. Further, the steering electric motor 13a generates steering force (torque) of operating the steering 13b during target-following control.

Figure 2:
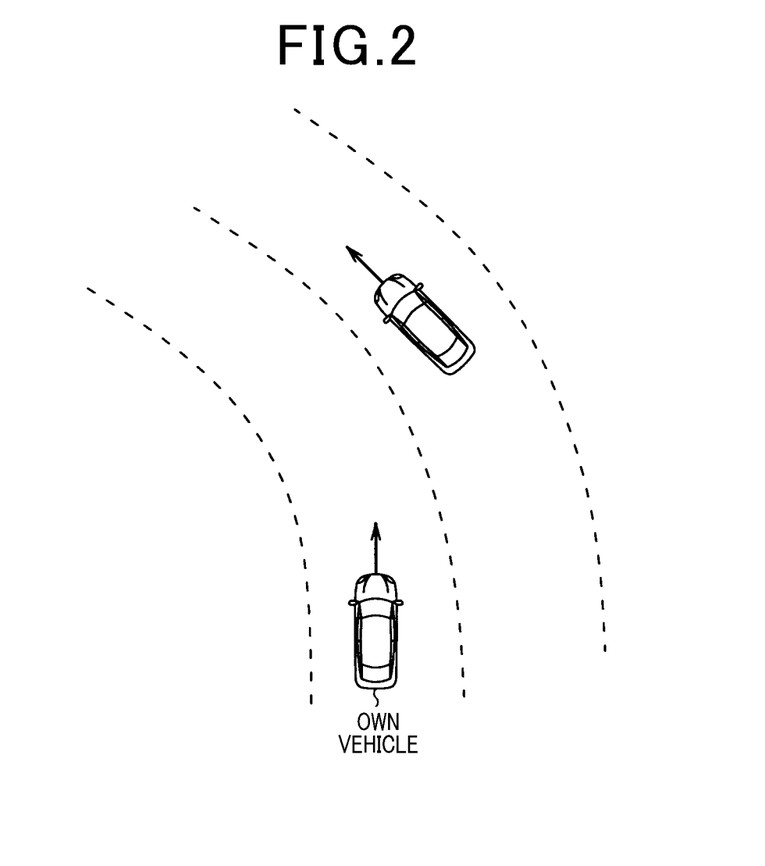
FIG. 2 is a schematic diagram illustrating a situation where a vehicle traveling in another lane is erroneously recognized as a preceding vehicle which is traveling ahead within an own lane.
Figures 4A, 4B:
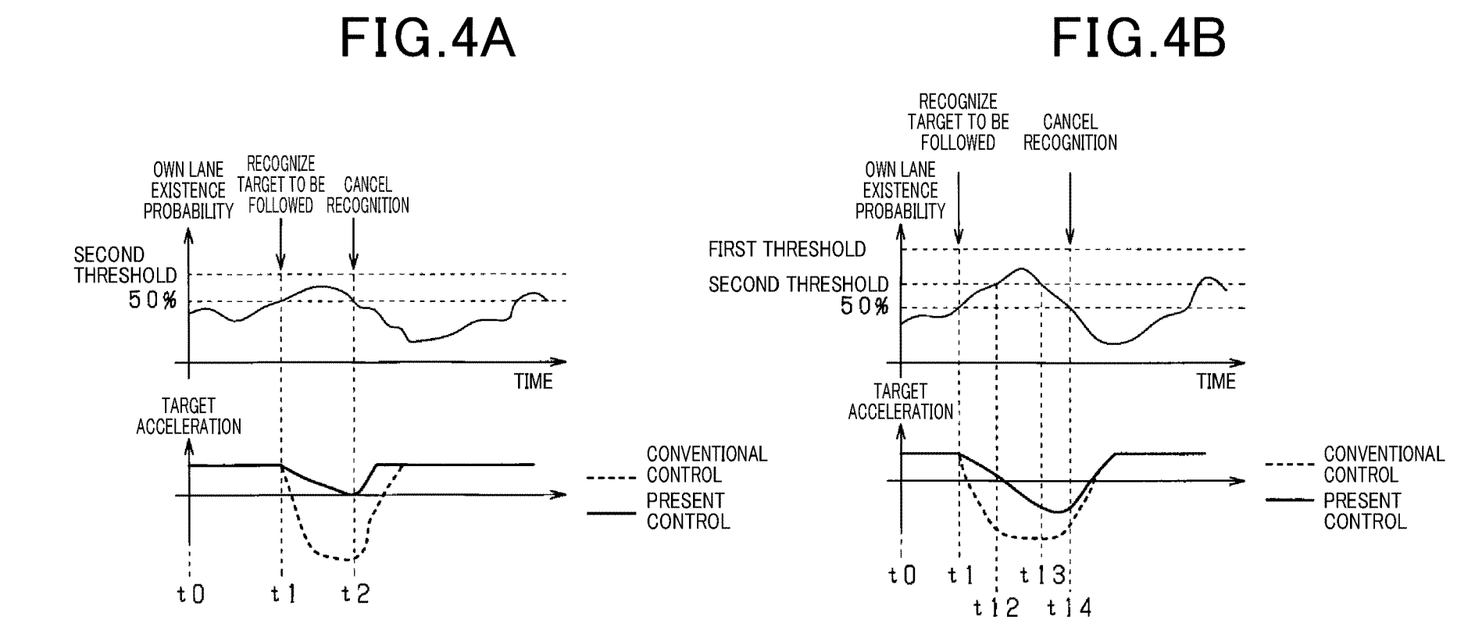
FIGS. 4A and 4B are timing charts illustrating an aspect of target acceleration control according to the present embodiment.

For example, as illustrated in FIG. 2, a case will be assumed where target-following control process is performed in a situation where the own vehicle is traveling in an inner lane among two lanes, and another vehicle is traveling in an outer lane. In this case, there is a possibility that, by the other vehicle turning left in a situation where the other vehicle is traveling ahead of the own vehicle, the other vehicle which turns left ahead in the traveling direction of the own vehicle may be captured. In this event, as illustrated in FIG. 4A, there is a case where the own vehicle erroneously recognizes the other vehicle as the target to be followed as a result of the own lane existence probability of the other vehicle becoming higher than the predetermined probability as the lateral location of the other vehicle becomes smaller. At this time, the relative speed of the own vehicle with respect to the other vehicle in the traveling direction of the own vehicle tends to be higher. In addition, in the case where the distance between the own vehicle and the target to be followed becomes shorter than the target distance between vehicles, as indicated with a dotted line in a bottom portion of FIG. 4A, there is a possibility that the own vehicle is unnecessarily decelerated as a result of the target acceleration being set at a negative value.

To address this, to determine whether the target to be followed truly is within the own lane, a first threshold, and a second threshold which is set at a value smaller than the first threshold and greater than the predetermined probability are provided separately from the predetermined probability. By this means, in the case where the own lane existence probability of the target is greater than the first threshold, it can be determined that a probability that the target to be followed is within the own lane is the highest. Further, in the case where the own lane existence probability of the target to be followed is greater than the second threshold and smaller than the first threshold, while the probability that the target to be followed is within the own lane is lower than that in the case where the own lane existence probability of the target to be followed is greater than the first threshold, it can be determined that the target to be followed substantially is within the own lane. In the case where the own lane existence probability of the target to be followed is smaller than the second threshold and greater than the predetermined probability, it can be determined that a state is an unclear state where, while the target to be followed may exist within the own lane, there is also a possibility that the target to be followed does not exist within the own lane.

By the way, while, in the present embodiment, a target is detected using the radar apparatus 12, even in the case where a target continuously exists, the target does not necessarily continue to be detected by the radar apparatus 12, and there is a case where the target cannot be detected in a certain detection cycle. In this case, it is difficult to determine whether the target actually disappears or the target has failed to be detected. Therefore, in the case where the target cannot be detected in a certain detection cycle, until predetermined time has elapsed since then, processing of continuously detecting the target assuming that the target exists has been conventionally performed. Then, in the case where the target cannot be detected after the predetermined time has elapsed, detection of the target is finished assuming that the target disappears. Given that such processing is performed, during a period in which the predetermined time has elapsed since the target recognized as the target to be followed was no longer detected by the radar apparatus 12, it is determined that a degree of recognition of the radar apparatus 12 with respect to the target to be followed is in a weakly recognized state where the degree of recognition is weaker than a predetermined degree.

The detection ECU 10 sets the reliability of the target to be followed on the basis of the calculated own lane existence probability and a determination result as to whether the degree of recognition of the radar apparatus 12 with respect to the target to be followed is in the weakly recognized state. In other words, whether the recognized target to be followed is truly appropriate as a target for target-following control is quantified as the reliability on the basis of the calculated own lane existence probability and the determination result as to whether the degree of recognition of the radar apparatus 12 with respect to the target to be followed is in the weakly recognized state.

As the own lane existence probability of the target to be followed is smaller, the target to be followed is less likely to exist within the own lane. If the target to be followed is not traveling within the own lane, because it can be considered that the target recognized as the target to be followed is inappropriate as a target for target-following control, the reliability of the target to be followed is set lower as the own lane existence probability of the target to be followed is smaller.

Further, in the case where the degree of recognition of the radar apparatus 12 with respect to the target to be followed is in the weakly recognized state, there is a possibility that the target recognized as the target to be followed does not even exist. Also in this case, because there is a possibility that the target recognized as the target to be followed is inappropriate as the target for target-following control, in the case where it is determined that the degree of recognition of the radar apparatus 12 with respect to the target to be followed is in the weakly recognized state, the reliability of the target to be followed is set lower than in a case where it is not determined that the degree of recognition of the radar apparatus 12 with respect to the target to be followed is in the weakly recognized state. The method for setting the reliability of the target to be followed will be described in more detail later.

The detection ECU 10 controls the acceleration of the own vehicle so that a temporal rate of change of the acceleration becomes smaller as the reliability set for the target recognized as the target to be followed is lower. More specifically, the target acceleration is set so that a jerk which is a value obtained by performing differentiation on the acceleration (differential value of the acceleration) becomes smaller as the reliability set for the target recognized as the target to be followed is lower.

The method for setting the reliability of the target to be followed will be described in more detail. In the case where the own lane existence probability of the target to be followed is smaller than the above-described predetermined probability, the reliability is not set in the first place assuming that a preceding vehicle traveling ahead within the own lane does not exist. In the case where the own lane existence probability of the target to be followed is greater than the predetermined probability and smaller than the second threshold, and, in addition, it is determined that the degree of recognition of the radar apparatus 12 with respect to the target to be followed is in the weakly recognized state, the reliability of the target to be followed is set at a fifth reliability which is the lowest. In the case where the own lane existence probability of the target to be followed is greater than the predetermined probability and smaller than the second threshold, and, in addition, it is determined that the degree of recognition of the radar apparatus 12 with respect to the target to be followed is not in the weakly recognized state, the reliability of the target to be followed is set at a fourth reliability which is higher than the fifth reliability.

In the case where the own lane existence probability of the target to be followed is greater than the second threshold and smaller than the first threshold, and, in addition, it is determined that the degree of recognition of the radar apparatus 12 with respect to the target to be followed is in the weakly recognized state, the reliability of the target to be followed is set at a third reliability which is higher than the fourth reliability. In the case where the own lane existence probability of the target to be followed is greater than the second threshold and smaller than the first threshold, and, in addition, it is determined that the degree of recognition of the radar apparatus 12 with respect to the target to be followed is not in the weakly recognized state, the reliability of the target to be followed is set at a second reliability which is higher than the third reliability.

In the case where the own lane existence probability of the target to be followed is higher than the first threshold, the reliability is set at a first reliability which is higher than the second reliability (which is the highest) regardless of a determination result as to whether the degree of recognition of the radar apparatus 12 with respect to the target to be followed is in the weakly recognized state. In the case where the own lane existence probability of the target to be followed is higher than e first threshold, the target to be followed is most likely to exist within the own lane. In this situation, a case will be assumed where the reliability of the target to be followed is set lower than in a case where it is not determined that the degree of recognition of the radar apparatus 12 with respect to the target to be followed is in the weakly recognized state, because it is determined that the degree of recognition of the radar apparatus 12 with respect to the target to be followed is in the weakly recognized state. In this case, if target acceleration control which will be described later is performed in accordance with the set reliability, because the target acceleration of the own vehicle is controlled so that the jerk becomes smaller than that in a case where the reliability is higher, a possibility of collision with the target to be followed increases in the case where the target to be followed exists. Therefore, in the case where the own lane existence probability of the target to be followed is higher than the first threshold, the reliability is set at the first reliability which is the highest reliability regardless of the determination result of the degree of recognition of the radar apparatus 12 with respect to the target to be followed. By this means, in the case where the target to be followed is within the own lane, even if the degree of recognition of the radar apparatus 12 with respect to the target to be followed is in the weakly recognized state, target-following control assuming that the target to be followed exists can be performed, so that it is possible to increase safety of target-following traveling.

The target acceleration is specifically set as follows in accordance with the reliability of the target to be followed set using the above-described method. For example, in the case where target-following control process is performed on the target to be followed for which the first reliability is set, the target acceleration is set in a similar manner to that set conventionally. Meanwhile, in the case where target-following control process is performed on the target to be followed for which the second reliability is set, the target acceleration is controlled so that the jerk becomes smaller than that in a case where target-following control process is performed on the target to be followed for which the first reliability is set. In this manner, because the target acceleration is controlled so that the jerk becomes smaller as the reliability of the target to be followed is lower, in the present embodiment, in the case where target-following control process is performed on the target to be followed for which the fifth reliability which is the lowest reliability is set, the target acceleration is controlled so that the jerk becomes the smallest.

Figure 3:
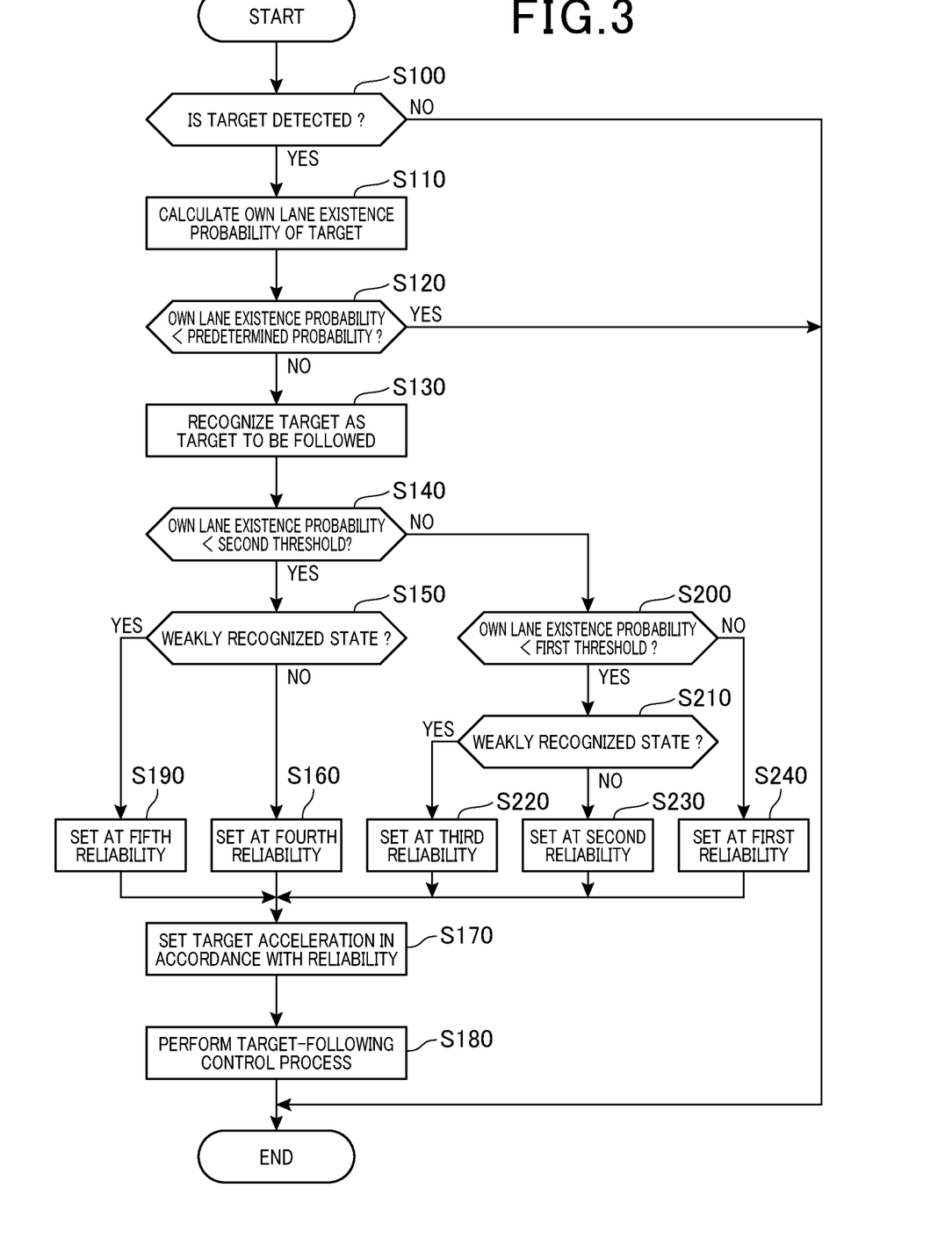
FIG. 3 is a flowchart of control to be performed by a detection ECU according to the present embodiment.

In the present embodiment, target acceleration control illustrated in FIG. 3 which will be described later is performed by the detection ECU 10. The target acceleration control illustrated in FIG. 3 is repeatedly performed with a predetermined period by the detection ECU 10 while the detection ECU 10 is powered on.

First, in step S100, it is determined whether a target is detected by the radar apparatus 12 In the case where a determination result of the determination processing in step S100 is Yes, the processing proceeds to step S110, and an own lane existence probability of the target detected by the radar apparatus 12 is calculated.

In step S120, it is determined whether the own lane existence probability of the target calculated in step S110 is smaller than the above-described predetermined probability. In the case where a determination result of the determination processing in step S120 is No, the processing proceeds to step S130, and the detected target is recognized as the target to be followed.

In step S140, it is determined whether the own lane existence probability of the target to be followed is smaller than the second threshold. In the case where a determination result of the determination processing in step S140 is Yes (S140: Yes), the processing proceeds to step S150.

In step S150, it is determined whether the degree of recognition of the radar apparatus 12 with respect to the target to be followed is in the weakly recognized state by determining whether it is during a period in which the predetermined time has elapsed since the target recognized as the target to be followed was no longer detected by the radar apparatus 12. In the case where a determination result of the determination processing in step S150 is No, the processing proceeds to step S160, and the reliability of the target to be followed is set at the fourth reliability. Then, the processing proceeds to step S170. In the case where a determination result of the determination processing in step S150 is Yes, the processing proceeds to step S190, and the reliability of the target to be followed is set at the fifth reliability. Then, the processing proceeds to step S170.

In the case where a determination result of the determination processing in step S140 is No, the processing proceeds to step S200. In step S200, it is determined whether the own lane existence probability of the target to be followed is smaller than the first threshold (the first threshold>the second threshold>the predetermined probability). In the case where a determination result of the determination processing in step S200 is Yes, the processing proceeds to step S210.

In step S210, it is determined whether the degree of recognition of the radar apparatus 12 with respect to the target to be followed is in the weakly recognized state by determining whether it is during a period in which the predetermined time has elapsed since the target recognized as the target to be followed was no longer detected by the radar apparatus 12. In the case where a determination result of the determination processing in step S210 is Yes, the processing proceeds to step S220, and the reliability of the target to be followed is set at the third reliability. Then, the processing proceeds to step S170. In the case where a determination result of the determination processing in step S210 is No, the processing proceeds to step S230, and the reliability of the target to be followed is set at the second reliability. Then, the processing proceeds to step S170.

In the case where a determination result of the determination processing in step S200 is No, the processing proceeds to step S240, and the reliability of the target to be followed is set at the first reliability. Then, the processing proceeds to step S170.

In step S170, the target acceleration is set while the jerk is restricted in accordance with the reliability set in one of step S160, step S190, step S220, step S230 and step S240. Then, in step S180, target-following control process is performed so that the own vehicle travels while following the target to be followed while accelerating and decelerating the own vehicle by transmitting a control command to the engine and the brake apparatus on the basis of the target acceleration set in step S170. Then, the present control is finished.

In the case where a determination result of the determination processing in step S100 is No, or in the case where a determination result of the determination processing in step S120 is Yes, the present control is finished.

An aspect of the target acceleration control according to the present embodiment will be described next with reference to FIG. 4A and FIG. 4B. Note that, in both FIG. 4A and FIG. 4B, the present control is indicated with solid lines, and conventional control is indicated with dotted lines. Further, for the purpose of explanation, it is assumed that, while the target-following control process is performed on the target to be followed, it is determined that the degree of recognition of the radar apparatus 12 with respect to the target recognized as the target to be followed is in the weakly recognized state.

In FIG. 4A and FIG. 4B, because a target for which the own lane existence probability is greater than the predetermined probability does not exist, in a situation where the target to be followed is not captured, the target acceleration is set so that the own vehicle travels at predetermined vehicle speed (see time t0 to t1). Then, in the case where a target for which the own lane existence probability becomes greater and exceeds the predetermined probability (50%) is detected, the target is recognized as the target to be followed (see time t1). In FIG. 4A and FIG. 4B, a situation is assumed where a distance between the target recognized as the target to be followed and the own vehicle is shorter than the target distance between vehicles. Therefore, the target acceleration is controlled to be greater in a negative direction.

In FIG. 4A, the own lane existence probability of the target to be followed is calculated as being greater than the predetermined probability and being smaller the second threshold. Further, because it is assumed that it is determined that the degree of recognition of the radar apparatus 12 with respect to the target to be followed is in the weakly recognized state, the reliability of the target to be followed is set at the fifth reliability. In this case, the target acceleration is controlled so that the jerk becomes smaller compared to that in the conventional control. Then, in the case where it is determined that the own lane existence probability of the target to be followed becomes smaller than the predetermined probability, target-following control performed on the target recognized as the target to be followed is cancelled, and the target acceleration control is also cancelled in accordance with this cancelation (see time t2). Then, the target acceleration is set so that the own vehicle travels at predetermined vehicle speed assuming that the target to be followed is not captured.

In FIG. 4B, during a period in which the own lane existence probability of the target to be followed is greater than the predetermined probability and smaller the second threshold (see time t1 to t12), the reliability of the target to be followed is set at the fifth reliability while also taking into account that it is determined that the degree of recognition of the radar apparatus 12 with respect to the target to be followed is in the weakly recognized state. Therefore, the target acceleration is controlled so that the jerk becomes smaller than that in the conventional control in a similar manner to the target acceleration control performed during time t1 to t2 in FIG. 4A. Then, in the case where the own lane existence probability of the target to be followed increases, and it is determined that the own lane existence probability of the target to be followed becomes greater than the second threshold and becomes smaller than the first threshold (see time t12), the reliability of the target to be followed is set at the third reliability while also taking into account that it is determined that the degree of recognition of the radar apparatus 12 with respect to the target to be followed is in the weakly recognized state. Therefore, the target acceleration is set so that the jerk becomes greater than that in a case where the reliability of the target to be followed is set at the fifth reliability.

In the case where the own lane existence probability of the target to be followed decreases, and the own lane existence probability of the target to be followed becomes greater than the predetermined probability and smaller than the second threshold, the reliability of the target to be followed is set at the fifth reliability. In accordance with this, the target acceleration is set so that the jerk becomes smaller than that in a case where the reliability of the target to be followed is set at the third reliability (see time t13). Then, in the case where it is determined that the own lane existence probability of the target to be followed becomes smaller than the predetermined probability, the target-following control performed on the target recognized as the target to be followed is cancelled, and the target acceleration control is also cancelled in accordance with this cancellation (see time t14). Then, assuming that a target to be followed is not being captured, the target acceleration is set so that the own vehicle travels at predetermined vehicle speed.

The present embodiment provides the following effects by the above-described configuration.

It is possible to appropriately set the reliability of the target to be followed on the basis of the own lane existence probability of the target to be followed and a determination result as to whether the degree of recognition of the radar apparatus 12 with respect to the target to be followed is in the weakly recognized state. Further, the acceleration of the own vehicle is controlled so that the jerk becomes smaller as the set reliability of the target to be followed is lower. By this means, it is possible to keep fluctuation of the acceleration of the own vehicle smaller as a possibility that the target which is not appropriate as the target for target-following control is erroneously recognized as the target to be followed is higher.

It is determined that the degree of recognition of the radar apparatus 12 with respect to the target to be followed is in the weakly recognized state during a period in which the predetermined time has elapsed since the target to be followed was no longer detected by the radar apparatus 12. By this means, it is possible to set the reliability of the target to be followed while taking into account a situation where the target temporarily disappears due to a failure to detect the target being followed.

The above-described embodiment can be also implemented while changes are made as follows. For comparison, the following configurations in other examples may be individually applied to the configuration of the above-described embodiment, or arbitrary combination may be applied to the configuration of the above-described embodiment.

In the above-described embodiment, the radar apparatus 12 detects a target. Concerning this point, the apparatus does not have to be limited to the radar apparatus 12, and, for example, an imaging apparatus may detect an object. The imaging apparatus includes a monocular camera using, for example, a CCD camera, a CMOS image sensor, a near-infrared camera, or the like, a stereo camera, or the like. In this case, if it is possible to detect white lines which separate the own lane on the basis of an image captured by the imaging apparatus, it is possible to determine whether the target is within the own lane more accurately. As a result, it is possible to set more accurate reliability for the target to be followed.

In the above-described embodiment, the target acceleration is controlled so that the jerk becomes smaller in accordance with the reliability of the target to be followed regardless of the distance between the own vehicle and the target to be followed. Concerning this point, it is also possible to perform processing of controlling the target acceleration so that the jerk becomes smaller in accordance with the reliability of the target to be followed on condition that the distance between the own vehicle and the target to be followed is longer than a predetermined distance. Note that, in the present another example, while the predetermined distance is set at a distance equal to the target distance between vehicles, the predetermined distance may be set longer or shorter than the target distance between vehicles.

Accuracy of target detection by the radar apparatus 12 degrades as the distance between the own vehicle and the target to be followed is longer. Further, as the distance between the own vehicle and the target to be followed is longer, it becomes more difficult to accurately detect a lateral location of the target to be followed, which results in occurrence of an error in the own lane existence probability of the target to be followed. Therefore, the target is more likely to be erroneously recognized as the target to be followed although the target is not traveling in the own lane. That is, it can be assumed that, as the distance between the own vehicle and the target to be followed is longer, the reliability of the target to be followed degrades. Therefore, in the case where the distance between the own vehicle and the target to be followed is longer than the predetermined distance, it is preferable to perform the present control.

Meanwhile, in the case where the distance between the own vehicle and the target to be followed is shorter than the predetermined distance, if the target acceleration is controlled so that the jerk becomes smaller because the reliability of the target to be followed is low, the own vehicle cannot be sufficiently decelerated even if the target to be followed exists, and there is a possibility that the own vehicle may collide with the target to be followed. Therefore, in the case where the distance between the own vehicle and the target to be followed is shorter than the predetermined distance, the acceleration can be controlled as appropriate so that the jerk becomes greater in accordance with the distance between the own vehicle and the target to be followed by performing conventional target-following control process without performing the present control process, so that it is possible to improve safety of target-following traveling.

While, in the above-described embodiment, a target is detected using the radar apparatus 12, an object detected by the radar apparatus 12 does not necessarily actually exist. That is, there is a case where the radar apparatus 12 may erroneously detect that an object exists for some reason even if a target does not exist. Therefore, even if an object is detected by the radar apparatus 12, there exists a situation where it is inappropriate to perform a target-following control process on the target detected by the radar apparatus 12.

It can be assumed that intensity of reflected waves received by the antenna in the case where the target is erroneously detected is smaller than intensity of reflected waves received by the antenna in the case where the target is normally detected even if the intensity is greater than a first predetermined intensity set for detecting a target. Therefore, a second predetermined intensity (second predetermined value) greater than the first predetermined intensity may be provided in addition to the first predetermined intensity, and, in the case where it is determined that the intensity of the reflected waves is greater than the first predetermined intensity and smaller than the second predetermined intensity, it may be determined that the degree of recognition of the radar apparatus 12 with respect to the target to be followed is in the weakly recognized state assuming that there is a possibility that the target may be erroneously detected. By this means, it is possible to set the reliability of the target to be followed while taking into account a possibility of erroneous detection of a target.

Determination as to whether the intensity of the reflected waves is greater than the first predetermined intensity and smaller than the second predetermined intensity (hereinafter, referred to as temporary flag determination) according to the present another example may be performed in place of determination as to whether it is during a period in which predetermined time has elapsed since the target recognized as the target to be followed was no longer detected by the radar apparatus 12 (hereinafter, referred to as extrapolating state determination) described in the above-described embodiment.

Alternatively, both the temporary flag determination and the extrapolating state determination may be performed, and, in the case where a positive determination result can be obtained from at least one of the determination, it may be determined that the degree of recognition of the radar apparatus 12 with respect to the target to be followed is in the weakly recognized state. Alternatively, reliability may be determined for each of the extrapolating state determination and the temporary flag determination. For example, the reliability of the target to be followed may be set higher in the case where a positive determination can be obtained in the extrapolating state determination than in the case where a positive determination result can be obtained in the temporary flag determination.

While the present disclosure has been described with reference to the examples, the present disclosure is not limited to the examples and structures. The present disclosure incorporates various modified examples and modifications within an equivalent range. In addition, various combinations, forms, and other combinations and forms including only one element or more or fewer elements fall within the scope and the scope of mind of the present disclosure.

What is claimed is:

1. A traveling control apparatus which is applied to a vehicle including a target detecting unit configured to detect targets existing ahead in a traveling direction of an own vehicle, and which includes a target-following control unit configured to recognize the target traveling ahead within an own lane which is a traveling lane in which the own vehicle travels, as a target to be followed, among the targets detected by the target detecting unit, and perform a target-following control process on the target to be followed, the traveling control apparatus comprising:
   a probability calculating unit configured to calculate a probability that the target to be followed is within the own lane;
   a determining unit configured to determine whether a degree of recognition of the target detecting unit with respect to the target to be followed recognized by the target-following control unit is in a weakly recognized state where the degree of recognition is weaker than a predetermined degree;
   a reliability setting unit configured to set a reliability of the target to be followed recognized by the target-following control unit on a basis of the probability calculated by the probability calculating unit and a determination result by the determining unit; and
   an acceleration control unit configured to control acceleration of the own vehicle so that a jerk which is a differential value of the acceleration becomes smaller as the reliability of the target to be followed set by the reliability setting unit is lower during a period in which the target-following control process is performed by the target-following control unit, wherein:
   to determine whether the target to be followed is within the own lane, a first threshold and a second threshold are provided, wherein the second threshold is set at a value smaller than the first threshold and greater than a predetermined probability;
   in a case where the probability calculated by the probability calculating unit is greater than the first threshold, it is determined that a probability that the target to be followed is within the own lane is a highest probability;
   the reliability setting unit is configured to set a plurality of reliabilities of the target;
   in a case where the calculated probability is greater than the first threshold, the reliability of the target is set at a first reliability which is the highest reliability among a plurality of reliabilities even when the degree of recognition of the target detecting unit with respect to the target to be followed is in the weakly recognized state; and
   in a case where the calculated probability is less than or equal to the first threshold, the reliability of the target is set at a reliability lower than the first reliability in response to determining that the degree of recognition of the target detecting unit with respect to the target to be followed is in the weakly recognized state.

2. The traveling control apparatus according to claim 1, wherein
   the acceleration control unit controls the acceleration so that the jerk becomes smaller as the reliability of the target to be followed set by the reliability setting unit is lower on condition that a distance between the own vehicle and the target to be followed is longer than a predetermined distance.

3. The traveling control apparatus according to claim 1, wherein
   the determining unit determines that a degree of recognition by the target detecting unit of the target to be followed, recognized by the target-following control unit, is in the weakly recognized state during a period in which a predetermined time has elapsed since the target to be followed recognized by the target-following control unit was no longer detected by the target detecting unit.

4. The traveling control apparatus according to claim 1, wherein:
   the target detecting unit acquires information in which a parameter for detecting the target and detects the target when the parameter included in the information is greater than a first predetermined value; and
   in a case where the parameter included in the information acquired by the target detecting unit when the target to be followed is detected is less than a second predetermined value which is set at a value greater than the first predetermined value, the determining unit determines that the degree of recognition by the target-following control unit, of the target to be followed detected by the target detecting unit, is in the weakly recognized state.

5. The traveling control apparatus according to claim 1, wherein the reliability setting unit is configured to:

set the reliability at a second reliability which is lower than the first reliability in a case where the probability calculated by the probability calculating unit is greater than the second threshold which is set at a value smaller than the first threshold, and is less than the first threshold, and, in addition, it is determined by the determining unit that the degree of recognition by the target detecting unit of the target to be followed is not in the weakly recognized state, set the reliability at a third reliability which is lower than the second reliability in a case where the probability calculated by the probability calculating unit is greater than the second threshold and is less than the first threshold, and, in addition, it is determined by the determining unit that the degree of recognition by the target detecting unit of the target to be followed is in the weakly recognized state, set the reliability at a fourth reliability which is lower than the third reliability in a case where the probability calculated by the probability calculating unit is less than the second threshold, and, in addition, it is determined by the determining unit that the degree of recognition by the target detecting unit of the target to be followed is not in the weakly recognized state, and set the reliability at a fifth reliability which is lower than the fourth reliability in a case where the probability calculated by the probability calculating unit is less than the second threshold, and, in addition, it is determined by the determining unit that the degree of recognition by the target detecting unit of the target to be followed is in the weakly recognized state.

* * * * *